Jan. 12, 1937.  D. M. LIGHT  2,067,610
BRAKE GEAR SAFETY DEVICE
Filed Aug. 6, 1934  2 Sheets-Sheet 1
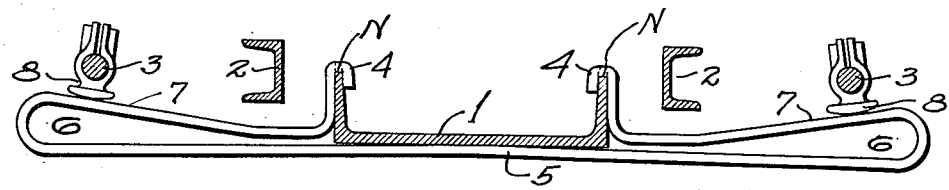
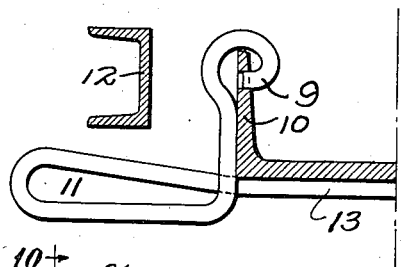
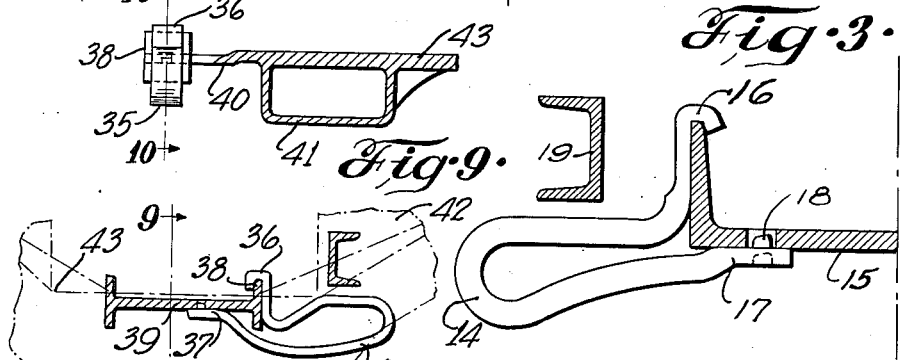
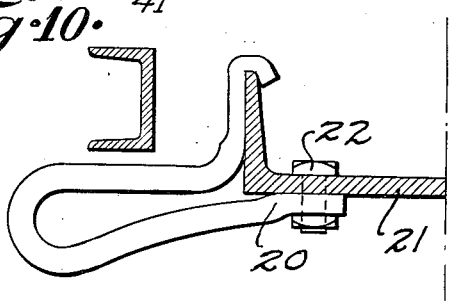
Inventor
DAVID M. LIGHT.
By Rodney Bedell
Attorney Jan. 12, 1937. D. M. LIGHT 2,067,610
BRAKE GEAR SAFETY DEVICE
Filed Aug. 6, 1934 2 Sheets-Sheet 2

Inventor
DAVID M. LIGHT.
By Rodney Bedell
Attorney

Patented Jan. 12, 1937

2,067,610

UNITED STATES PATENT OFFICE 2,067,610

BRAKE GEAR SAFETY DEVICE

David M. Light, Chicago, Ill., assignor to Chicago Railway Equipment Company, Chicago, Ill., a corporation of Illinois Application August 6, 1934, Serial No. 738,737

21 Claims. (Cl. 188—210)

The invention relates to devices for safeguarding railway truck brake gear equipment such as brake beam assemblies including levers and connecting rods, etc. Such safety devices are usually applied to the truck spring plank or to a bracket provided on the truck side frame or to the truck bolster or other truck part adjacent to the brake gear.

The main object of the invention is to avoid or minimize machining of the truck part to which the device is attached, and to reduce and simplify the labor required to apply the device to the truck part or to remove it therefrom.

More particularly, the invention consists in a device held in place on the truck part by means of spring action and it is an additional object of the invention to utilize a maximum portion of the device to provide the spring action and also to make the portion of the device engaging its support relatively rigid and thereby reduce the tendency of the device working loose from its support.

In the accompanying drawings which illustrate a selective embodiment of the invention—

Figure 1 is a transverse section through a truck spring plank and adjacent brake beams with one form of the safety device applied to the spring plank and underlying the beams. The remainder of the truck structure forms no part of the present invention and is so well known in the art that the same is not illustrated and it will be understood that the truck structure may be of any familiar type.

Figures 2, 3, 4 and 5 correspond to the left hand portion of Figure 1 and illustrate various modifications of the invention.

Figure 6 corresponds to Figure 1 and illustrates another modification.

Figure 7 corresponds to the right hand portion of Figure 1 and illustrate another modification.

Figure 9 is a vertical transverse section through a part of a railway truck embodying another form of the invention and is taken on line 9—9 of Figure 10.

Figure 10 is a partial vertical longitudinal section taken on line 10—10 of Figure 9.

Figure 5:
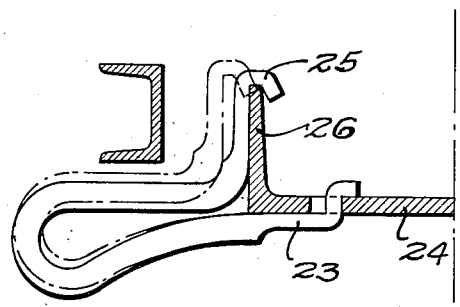

In Figure 1, the spring plank 1 is of channel section, the flanges being turned upwardly, and the brake beams are of the truss type and each comprises a compression member 2 and a tension member 3. The beams will be suspended from the truck frame by the usual hangers (not shown).

The safety device consists of a bar of round or flat spring material having terminal portions 4, hooked over the upturned flanges of the spring plank, and a middle portion 5 engaging the bottom face of the spring plank web. Intermediate the portions 4 and 5 the bar, on each side of the spring plank, forms a loop 6 extending outwardly from the spring plank and beneath the brake beam forming a safety guard functioning in the event of the failure of the brake hanger.

The loop 6 includes a guide element 7 on which the brake beam chair 8 may slide to maintain the angular relation between the brake beam and the wheel to which the brake is applied. Downward blows on the brake beam will be yieldingly resisted by the same spring qualities of the loop which enable it to grip the spring plank. It will be understood that this guide feature, or third or fourth point support as it may be called, is an optional feature which is not essential to the remaining features of the invention.

The device being of spring material may be hooked onto the spring plank by distorting the device manually, using a lever, if necessary. Preferably the spring plank flange is notched at N to position the device along the flange, but such notching is not essential and the friction produced by the spring grip normally would be sufficient to hold the device in position. The elongated loop easily accommodates such distortion and no substantial strains are set up in the structure.

In Figure 2 the end of the device has a return bend 9 and the flange 10 of the spring plank is perforated to receive the end of this return bend. The loop 11 is shorter than the loop shown in Figure 1 and underlies the compression member 12 of the beam only, thus serving as a safety device and not possessing the guide feature illustrated in Figure 1. The under leg of the loop forms the flange engaging element and the middle portion 13 of the bar contacts the spring plank throughout the width. The device is applied and removed and functions similarly to the device shown in Figure 1.

Figure 3 illustrates a safety device 14 arranged for application to one side only of the spring plank 15. The terminals 16 and 17 of the device engage the flange and the bottom of the spring plank, respectively, and the device is positioned partly by the projection of a lug 18 on the terminal 17 into a hole provided therefor in the web of the spring plank. The loop portion of the device underlies the brake beam compression member 19 and possesses sufficient flexibility to accommodate the distortion of the device for its application to the spring plank and its removal therefrom.

Figure 4 illustrates a similar structure in which the lower terminal 20 is secured to the spring plank 21 by a bolt 22.

Figure 5 illustrates a structure in which the lower terminal 23 forms a hook which is inserted through an opening in the web 24 of the spring plank and the other terminal 25 of the device is then hooked over the top of the spring plank flange 26.

Figure 6:
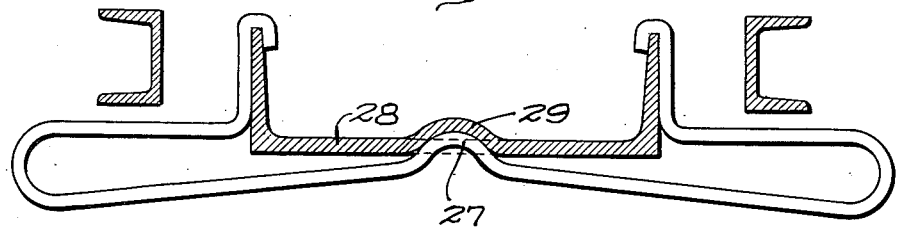

Figure 6 illustrates a single device underlying both of the brake beams and the middle portion 27 is crimped to fit into a recess provided therefor in the web 28 of the spring plank. The recess in the spring plank may take the form of a dent, as shown at 29, or may constitute an opening through the web.

Figure 7:
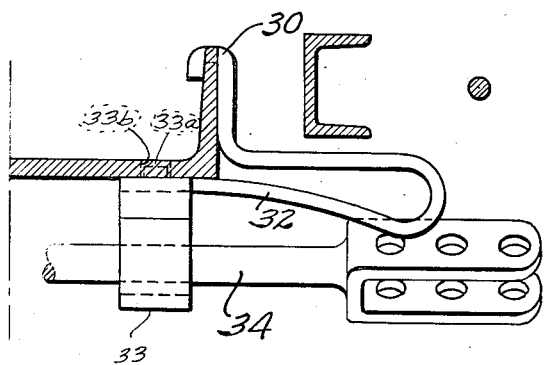
Figure 8:
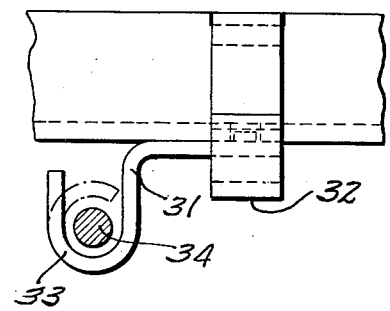
Figure 8 is a front view of the structure shown in Figure 7.

Figures 7 and 8 illustrate a device in which the upper terminal 30 is seated in a notch in the flange of the spring plank and the device includes as an additional feature an extension 31 depending from the lower arm 32 of the device and terminating in a hook 33 arranged to underlie the bottom connecting rod 34 of the brake gear, the device serving to engage the brake beam or the bottom connection if either drops from its normal position. The lug 33a fits loosely in the spring plank aperture 33b and the spring action in the loop 32 serves to prevent breaking of the depending portion 33 of the device in case of a blow from an object between the rails. The spring loop portion also functions to maintain the terminal elements 30 and 33a resiliently attached to the spring plank as in the previous forms.

In Figures 9 and 10 is shown a brake beam safety guard loop 35 similar to the loop 14 in Figure 3 and with terminal portions 36 and 37 attached to the upright flange 38 and web portion 39, respectively, of an arm 40 projecting inwardly from the bottom part 41 of the truck side frame or wheel piece 42. The arm 40 in the present instance constitutes an integral extension on the bolster spring seat element 43 and has an I-shaped end part including the flange 38 and web 39 engaging the guard loop terminals. The arm may be separately formed, if desired, and also may be otherwise shaped provided suitable elements are retained for cooperating with the guard terminals and may be associated with any other convenient truck part.

In all of the forms of the invention shown, the devices serve to safeguard the brake gear from dropping upon the tracks or roadway and thereby creating a hazard which frequently results in derailment. Each of the devices is retained in position on the supporting truck part by the elasticity of the structure and the spring action is largely, if not entirely, in that portion of the device spaced from the terminal or other portions of the device engaging the spring plank. This affords a greater area throughout which the distortion occurs and minimizes the degree of distortion of the fibres of the device and thereby effecting the main object of the invention as previously stated.

The guard devices in each of the forms may, in general, be attached to a side frame arm, as in Figures 9 and 10 or to any other convenient truck part. Also each of the guard loops may be extended as in Figure 1 so as to function as a brake beam guide or support and it would be within the spirit of the invention to associate a brake connecting rod guard, as in Figures 7 and 8, with the brake beam guards in any of the other forms, the spring action of the device being beneficial in both the brake rod and brake beam guards. Obviously, the device may be varied otherwise than as shown and the exclusive use of such modifications as come within the scope of the claims is contemplated.

I claim:

1. A railway brake gear safety device comprising a terminal for engaging a support element, an intermediate part extending away from said terminal to underlie a brake gear part and doubled back on itself to form a spring-like loop, and another part arranged to engage said support element and be positioned by the spring action of said loop to cooperate with said terminal to hold the device in position on said support.

2. A railway brake gear safety device comprising a looped member having one end arranged to engage an upwardly facing support element and having the other end arranged to engage a downwardly facing support element, said device including yielding structure whereby said elements may be moved relative to each other to facilitate application and removal of the device to and from the support.

3. A railway brake gear safety device comprising a looped member constructed and arranged for application to a support and to underlie a brake gear structure, said looped member having one end arranged to overlie and engage an upstanding flange on the support and having another part facing upwardly to engage an oppositely facing portion of the support, said member including elements for engaging the support to hold the device in predetermined position, said member being of yielding material to normally hold said elements engaged as described but providing for ready intentional disengagement thereof.

4. A railway brake gear safety device comprising a looped member having a downwardly facing terminal arranged to engage an upwardly facing element on a support and having an upwardly facing terminal with a projection arranged to engage a recess in a downwardly facing part of a support.

5. In a railway brake gear safety device, a looped member having one end provided with a downwardly facing hook to engage an upstanding flange on a support and having its other end provided with an upwardly extending projection for engaging a recess in the lower part of the support, said device including spring structure yieldingly holding said ends in predetermined relation.

6. In a brake gear safety device, a bar with its ends forming downturned hooks arranged to overlie the opposite flanges of a channel-shaped truck part and intermediate its ends forming loops extending outwardly in opposite directions from said ends, the middle portion of the bar normally projecting upwardly between said loops, said bar being formed of spring material whereby said middle portion may be distorted to frictionally engage the bottom of said spring plank when said hooked ends are applied to the flanges thereof.

7. In combination, a railway truck part and a device having relatively movable elements for application to said part to be supported thereby and structure projecting laterally from both of said elements and having a portion disposed to underlie and safeguard a brake gear and being of spring material for maintaining said elements in assembled relation with said part.

8. In combination, a railway truck spring plank and a looped member having its ends engaging upwardly and downwardly facing elements, respectively, on said spring plank with the loop extending outwardly from said spring plank to underlie the brake gear.

9. In combination, a railway truck part and a safety device bar having its ends overlying upwardly facing elements on said part and having its intermediate part underlying and yieldingly engaging said part and extending outwardly therefrom in opposite directions to underlie spaced brake gear structures.

10. In combination, a railway truck part, a brake beam, and a looped member having both its legs engaging said part and extending outwardly from said part beneath said brake beam, there being interengaging elements on said brake beam and loop whereby the latter serves to guide the beam in its movement towards and from the truck wheel.

11. Structure as specified in claim 10 in which the looped member is formed of spring material and yieldingly resists forces tending to divert the brake beam from its normal path.

12. In combination, a railway truck part, brake beams on opposite sides thereof, and a member having its ends engaging elements on opposite sides of said truck part and the portion intermediate its ends forming an elongated loop structure extending in opposite directions from said part beneath said brake beams and including inclined elements contacting with said brake beams to guide the latter in their movement towards and from the wheels, all of said intermediate portion forming a yielding structure for retaining said ends in position on the truck part and maintaining travel of said brake beams along their normal path of movement.

13. Structure as specified in claim 12 in which said truck part constitutes a spring plank extending across the truck between said brake beams.

14. A safety guard for brake connecting rods comprising spaced end portions for engaging a support, a spring loop between said end portions for maintaining said portions attached to the support, and structure yieldingly supported by said spring loop and disposed to underlie the brake rod.

15. A brake gear guard device comprising spaced end portions for engaging a support and an intermediate spring loop adapted to be distorted to apply the device to a support and to yieldingly maintain said end portions attached to the support, one of said end portions carrying structure adapted to underlie a brake rod and yieldingly supported by said spring loop and said spring loop extending laterally beyond the remaining parts of the guard and functioning as a brake beam safety guard.

16. A railway brake gear safety device comprising a portion for engaging an upwardly facing element on a support member, a part extending laterally from said portion to underlie and support a brake gear and doubled on itself to form a loop structure having a portion arranged to engage a downwardly facing element on said support member, said loop structure possessing sufficient elasticity to grip said support member between said portions and maintain said device in position on said support member irrespective of the weight or movements of said brake gear.

17. A one-piece brake beam safety support comprising a single spring steel bar having its free ends formed into hook members engaging over the vertical flanges of a spring plank of a railway car truck, said bar being doubled adjacent each hook member, said doubled sections projecting laterally outwardly from the spring plank and forming supports, said bar comprising an upwardly bowed section engaging the bottom of the spring plank, said bowed section connecting said doubled sections.

18. In a safety support adapted to be attached to the usual channel-shaped spring plank of a railway car truck, the combination with a hook member engaged over one of the vertical flanges of the spring plank; of an arm formed integral with the hook member and extending laterally from said spring plank, said arm and hook member comprising a single, continuous piece of spring steel, said arm being formed by a doubled section of said piece of steel; and a resilient extension on the inner end of said arm yieldingly engaging beneath the spring plank, said extension forming a part of one of the members of said doubled section.

19. A support comprising a bar of spring steel including doubled sections extending laterally from the usual spring plank of a railway car truck, an upstanding hook section forming a continuation of one of the members of said doubled section and engaging over one of the flanges of the spring plank, and an arm yieldingly engaging the bottom side of the spring plank, said arm forming a continuation of the other member of said doubled section.

20. A one-piece supporting means comprising a continuous resilient bar having doubled end sections forming horizontally disposed arms, each doubled section comprising upper and lower members connected at the outer ends of the corresponding arm, said lower members of said arms being connected by a central bowed section engaging beneath the spring plank, said upper member of each arm being bent upwardly at its inner end and having a hook at the extremity thereof engaging over the corresponding flange of the spring plank.

21. In a brake gear safety device, a bar having its ends arranged to engage the upper edges of a channel spring plank and intermediate its ends forming spring loop structures extending outwardly from said ends in opposite directions, said bar being shaped to be stressed in application to a channel spring plank to distort its intermediate portion to hold said ends in securing position.

DAVID M. LIGHT.